(12) United States Patent
Dölker

(10) Patent No.: US 9,890,735 B2
(45) Date of Patent: Feb. 13, 2018

(54) METHOD FOR CONTROLLING A PRESSURE

(71) Applicant: MTU FRIEDRICHSHAFEN GMBH, Friedrichshafen (DE)

(72) Inventor: Armin Dölker, Friedrichshafen (DE)

(73) Assignee: MTU FRIEDRICHSHAFEN GMBH, Friedrichshafen (DE)

(*) Notice: Subject to any disclaimer, the term of this patent is extended or adjusted under 35 U.S.C. 154(b) by 0 days.

(21) Appl. No.: 14/783,563

(22) PCT Filed: May 23, 2014

(86) PCT No.: PCT/EP2014/001399
§ 371 (c)(1),
(2) Date: Oct. 9, 2015

(87) PCT Pub. No.: WO2014/191099
PCT Pub. Date: Dec. 4, 2014

(65) Prior Publication Data
US 2016/0084191 A1    Mar. 24, 2016

(30) Foreign Application Priority Data

May 31, 2013    (DE) .................. 10 2013 009 147

(51) Int. Cl.
| | | |
|---|---|---|
| F02D 41/38 | (2006.01) | |
| F02M 59/36 | (2006.01) | |
| F02D 19/06 | (2006.01) | |
| F02D 41/06 | (2006.01) | |
| F02D 41/14 | (2006.01) | |
| F02D 41/20 | (2006.01) | |
| F02D 41/00 | (2006.01) | |
| F02M 63/02 | (2006.01) | |

(52) U.S. Cl.
CPC ..... *F02D 41/3845* (2013.01); *F02D 19/0605* (2013.01); *F02D 19/0649* (2013.01);
(Continued)

(58) Field of Classification Search
CPC .. F02D 41/3845; F02D 41/20; F02D 19/0649; F02D 19/0605; F02D 41/1402;
(Continued)

(56) References Cited

U.S. PATENT DOCUMENTS

| | | |
|---|---|---|
| 6,318,343 B1 | 11/2001 | Nakagawa et al. |
| 6,450,147 B2 | 9/2002 | Demura et al. |

(Continued)

FOREIGN PATENT DOCUMENTS

| | | |
|---|---|---|
| DE | 19505127 C1 | 3/1996 |
| DE | 19956267 A1 | 5/2000 |

(Continued)

*Primary Examiner* — Joseph Dallo
*Assistant Examiner* — Scott A Reinbold
(74) *Attorney, Agent, or Firm* — Lucas & Mercanti, LLP; Klaus P. Stoffel

(57) ABSTRACT

A method and an assembly for controlling the pressure in a high-pressure region of an injection system in an internal combustion engine. A set high pressure is compared to an actual high pressure in order to determine a control deviation, the control deviation representing an input variable of a controller. A high pressure pump is controlled by a solenoid valve and the angle at which the delivery of fuel by the at least one high-pressure pump is to start is used as a manipulated variable of the high-pressure closed-loop control system.

10 Claims, 6 Drawing Sheets

(52) U.S. Cl.
CPC ....... *F02D 41/062* (2013.01); *F02D 41/1402* (2013.01); *F02D 41/20* (2013.01); *F02M 59/366* (2013.01); *F02D 41/0025* (2013.01); *F02D 2041/142* (2013.01); *F02D 2041/1409* (2013.01); *F02D 2041/1422* (2013.01); *F02D 2041/202* (2013.01); *F02D 2041/3881* (2013.01); *F02D 2200/0602* (2013.01); *F02D 2200/101* (2013.01); *F02D 2250/31* (2013.01); *F02M 63/023* (2013.01); *Y02T 10/36* (2013.01)

(58) Field of Classification Search
CPC ............. F02D 41/062; F02D 2041/202; F02D 2200/101; F02D 2041/3881; F02D 2041/1422; F02D 2041/142; F02D 2041/1409; F02D 41/0025; F02D 2250/31; F02D 2200/0602; Y02T 10/36; F02M 59/366; F02M 63/023
USPC ........................................................ 123/458
See application file for complete search history.

(56) References Cited

U.S. PATENT DOCUMENTS

| | | | |
|---|---|---|---|
| 7,121,263 B2 | 10/2006 | Eser | |
| 7,163,001 B2* | 1/2007 | Jung | F02D 41/2409 123/446 |
| 7,270,115 B2 | 9/2007 | Dolker | |
| 7,546,831 B2 | 6/2009 | Kaneko | |
| 2001/0023684 A1* | 9/2001 | Demura | F02D 41/1482 123/457 |
| 2004/0111210 A1* | 6/2004 | Davis | F02D 19/027 701/103 |
| 2007/0056561 A1* | 3/2007 | Dolker | F02D 41/3845 123/458 |
| 2008/0127943 A1* | 6/2008 | Kaneko | F02M 59/243 123/456 |
| 2009/0114170 A1* | 5/2009 | Dolker | F02B 29/0443 123/41.09 |
| 2010/0043754 A1 | 2/2010 | Hirata | |
| 2011/0232610 A1 | 9/2011 | Okamoto | |
| 2012/0226428 A1 | 9/2012 | Dölker | |
| 2016/0040609 A1* | 2/2016 | Flohr | F02D 41/008 123/526 |

FOREIGN PATENT DOCUMENTS

| | | |
|---|---|---|
| DE | 10162988 A1 | 7/2003 |
| DE | 10313615 A1 | 11/2003 |
| DE | 10342130 A1 | 4/2005 |
| DE | 102004023365 A1 | 12/2005 |
| DE | 102009028752 A1 | 2/2010 |
| DE | 102009050469 A1 | 4/2011 |
| EP | 1136686 A2 | 9/2001 |

* cited by examiner

METHOD FOR CONTROLLING A PRESSURE

The present application is a 371 of International application PCT/EP2014/001399, filed May 23, 2014, which claims priority of DE 10 2013 009 147.0, filed May 31, 2013, the priority of these applications is hereby claimed and these applications are incorporated herein by reference.

BACKGROUND OF THE INVENTION

The invention pertains to a method for controlling a pressure in a high-pressure region of an injection system in an internal combustion engine and to an arrangement for implementing the presented method.

In internal combustion engines, injection systems are used to deliver fuel into the combustion chambers. The phrase "common-rail injection", also called "accumulator injection", is used to refer to a known injection system.

In a common-rail injection system, a high-pressure pump conveys fuel from a low-pressure region to a pressure accumulator, the so-called rail. The inlet cross section is typically controlled by a suction throttle. Injectors, which inject the fuel into the combustion chambers, i.e., the cylinders, are connected to the rail.

It is necessary to keep the pressure in the rail at a certain level in order to guarantee good combustion quality. For this purpose, a pressure control system is provided. This comprises, for example, a pressure controller, the suction throttle together with the high-pressure pump, and the rail. The pressure in the rail is thus the controlled variable. The measured pressure values are typically converted by way of a filter into an actual rail pressure, which is then compared with a nominal rail pressure. The deviation resulting from the comparison is converted by the pressure controller into a control input for the suction throttle. The pressure controller, the high-pressure pump with suction throttle, and the rail form the high-pressure control circuit.

A high-pressure control circuit is known in which the high fuel pressure is controlled by means of the suction throttle. The fuel is conveyed in this case by a single high-pressure pump.

A method for controlling the high fuel pressure is also known which again uses a suction throttle, in this case in a common-rail system with separate rails.

DE 103 42 130 A1 describes a method for operating an internal combustion engine with direct fuel injection. Here the fuel pressure in the fuel accumulator or rail is detected, and the length of the injection time is calculated on the basis of the detected value.

Injection systems are also known in which more than one type of fuel is burned. Injection systems in which two different fuels are used are called "dual-fuel injection systems". In a dual-fuel injection system, both diesel fuel and gasoline can be injected into the combustion chamber of the engine.

SUMMARY OF THE INVENTION

The method presented here serves to control the pressure in a high-pressure region of an injection system in an internal combustion engine comprising at least one high-pressure pump, according to which method a nominal high pressure is compared with an actual high pressure in order to determine a control deviation, wherein the control deviation represents an input variable to a controller, wherein the at least one high-pressure pump is controlled by a solenoid (operated) valve, and the angle at which the delivery of fuel by the at least one high-pressure pump should begin is used as a control input to the high-pressure control circuit.

In one embodiment, the angle is determined on the basis of a nominal volumetric flow. The angle can also be determined by means of a characteristic diagram, the input variables of which are the speed of the engine and the nominal volumetric flow.

A $PI(DT_1)$ high-pressure controller can be used as the controller.

In another embodiment, a number of high-pressure pumps are provided, wherein the number is taken into account in the calculation of the nominal volumetric flow.

The method can also be implemented in a high-pressure region of an injection system in which several different fuels are burned.

An arrangement for controlling the pressure in a high-pressure region of an injection system in an internal combustion engine comprising at least one high-pressure pump is also presented, which arrangement is configured in particular to implement the method described above. A nominal high pressure is compared with an actual high pressure to determine a control deviation, wherein the control deviation represents an input variable to a controller, wherein the at least one high-pressure pump is controlled by a solenoid (operated) valve, and the angle at which the delivery of fuel by the at least one high-pressure pump should begin is used as a control input to the high-pressure control circuit.

A $PI(DT_1)$ high-pressure controller can serve as the controller.

In addition, the arrangement can be provided for an injection system in which several different fuels are burned.

In an embodiment of the method presented here, therefore, one or more high-pressure pumps convey the fuel, such as diesel fuel, into the fuel rail. The diesel high pressure is usually adjusted to the nominal diesel high pressure by means of a suction throttle. In the case of a dual-fuel injection system, one or more additional high-pressure pumps convey gasoline into a second, separate fuel rail. Here the gasoline high pressure is kept at the nominal gasoline high-pressure value by a solenoid valve-controlled high-pressure pump. The high-pressure gasoline pump is driven by the camshaft. By the use of an appropriate gear ratio, the rotational speed of the high-pressure gasoline pump is identical to the engine speed.

It must be kept in mind that the process by which the solenoid valve-controlled high-pressure pump delivers the fuel comprises four phases. In phase 1, the piston of the high-pressure gasoline pump moves downward. No current flows through the solenoid (operated) valve; that is, the intake channel is open. As a result, gasoline is now drawn from the fuel tank.

In phase 2, the piston of the high-pressure pump moves upward. No current flows through the solenoid (operated) valve at first, so that it is still possible for gasoline to flow into the cylinder of the high-pressure pump.

In phase 3, current is sent through the solenoid (operated) valve, which has the effect of closing the suction channel. Because the piston of the high-pressure pump continues to move upward, the pressure in the interior of the cylinder simply builds up. When the pressure in the cylinder finally exceeds the rail pressure, the gasoline is conveyed into the rail.

The electric current signal, by which the solenoid (operated) valves are actuated, is structured like the current signal of an injector; it therefore has a rising phase, a holding phase, and a phase of falling current. It must be kept in mind that the fuel delivery begins after the rising phase ("pull-in time") is over and the holding phase begins.

In phase 4, the electric current is no longer active. The piston continues to move upward. As a result of the interior pressure in the cylinder, the solenoid (operated) valve remains closed. When the piston reaches top dead center, the entire quantity of fuel is ejected. Then the piston moves back down again.

The method presented here, at least in some of its embodiments, has the following features:

- the gasoline high-pressure pump is controlled by a solenoid (operated) valve;
- the nominal gasoline high pressure depends on the nominal torque and the engine speed;
- the control input to the gasoline high-pressure control circuit is the beginning of fuel delivery; each of the gasoline high-pressure pumps is actuated on the basis of this angle;
- when the engine is running, the beginning of fuel delivery is the output variable of the gasoline pump characteristic diagram. Input variables of this characteristic diagram are the engine speed and the nominal volumetric flow;
- the nominal volumetric flow represents the nominal volumetric flow of fuel of an individual high-pressure gasoline pump;
- the total nominal volumetric flow of fuel is the limited sum of the PI(DT$_1$) high-pressure controller output and the nominal gasoline consumption as disturbance variable;
- the total nominal volumetric flow of fuel is divided by the number of high-pressure gasoline pumps; the result represents the input variable to the gasoline pump characteristic diagram;
- the proportional coefficient of the high-pressure controller is calculated from a constant component and a dynamic component dependent on the gasoline high pressure;
- the integrating component of the gasoline high-pressure controller is set to zero when the engine is still in the starting phase and the presettable initialization high pressure has not yet been reached;
- once the engine has completed the starting phase or has reached the initialization high pressure, the integrating component of the high-pressure controller is limited in the downward direction to the negative disturbance variable and is limited in the upward direction as a function of the engine speed after a presettable limit speed value has been exceeded.

It must be kept in mind that the method described here can be used both in the case of a single rail and in the case of separate rails.

Additional advantages and embodiments of the invention can be derived from the attached drawings and from the description of those drawings.

It is obvious that the previously mentioned features and those to be explained below are usable not only in the specific combinations given but also in other combinations or on a stand-alone basis without leaving the scope of the present invention.

The invention is illustrated schematically on the basis of exemplary embodiments in the drawings and is described in detail below with reference to the drawings:

DETAILED DESCRIPTION OF THE INVENTION

Figure 1:
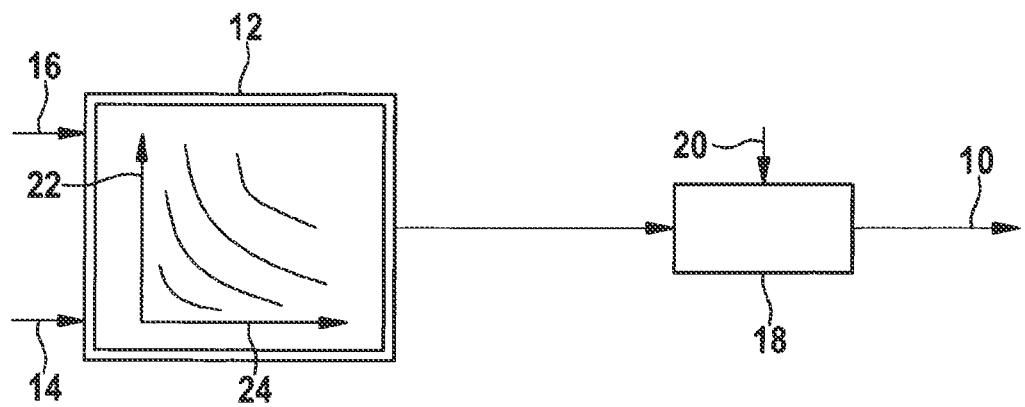
FIG. 1 shows how the nominal high pressure is calculated.

FIG. 1 shows how the nominal high pressure of the gasoline high-pressure controller is calculated. The nominal high-pressure 10 is first acquired from the 3-dimensional characteristic diagram 12 with the input variables engine speed 14 and nominal torque 16. Then a filtering process is carried out by means of a PT1 filter 18. A filter constant 20 can also be specified. In the characteristic diagram 12, curves of the nominal torque are plotted on an ordinate 22 versus the engine speed on the abscissa 24.

Figure 2:
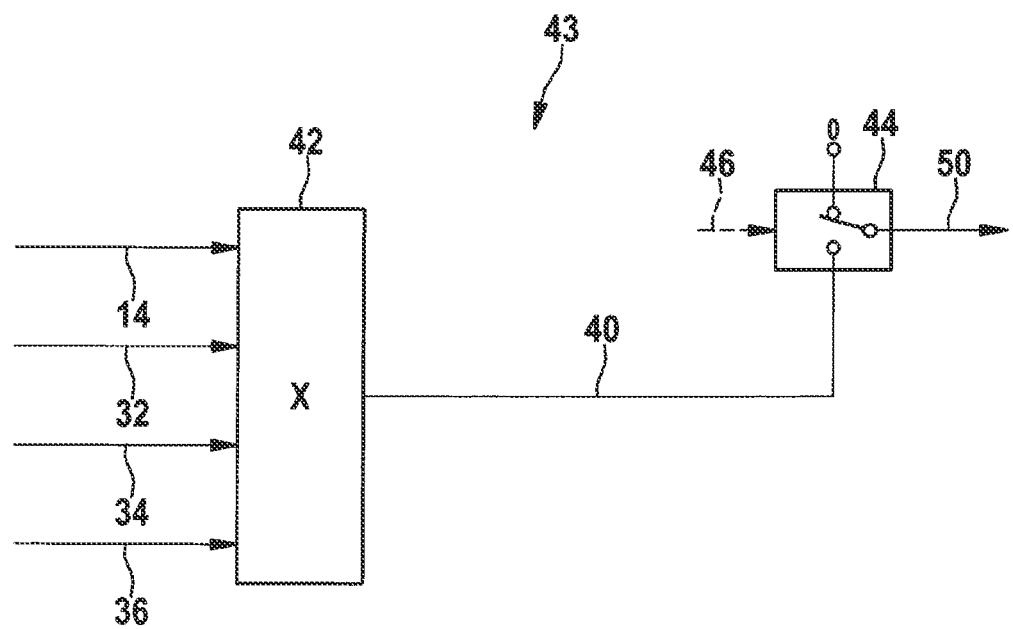
FIG. 2 shows how the nominal consumption of gasoline is calculated.

FIG. 2 shows how the nominal consumption 50 of gasoline is calculated, which represents the disturbance variable of the gasoline high-pressure controller. For this calculation, the reference number 43 is used; see FIG. 3.

If the engine is not yet synchronized, no injection will occur. In this case, the logical signal 46 has the value "true", and the switch 44 assumes the upper position. This means that the nominal gasoline consumption 50 in this case is identical to zero. Once synchronization has occurred, the switch 44 assumes the lower position, which means in this case that the nominal gasoline consumption 50 is identical to the output signal 40 of the calculation unit 42. This calculation unit is a multiplier with the input signals engine speed 14, number of active cylinders 32, nominal injection quantity 34, and a constant 36.

Figure 3:
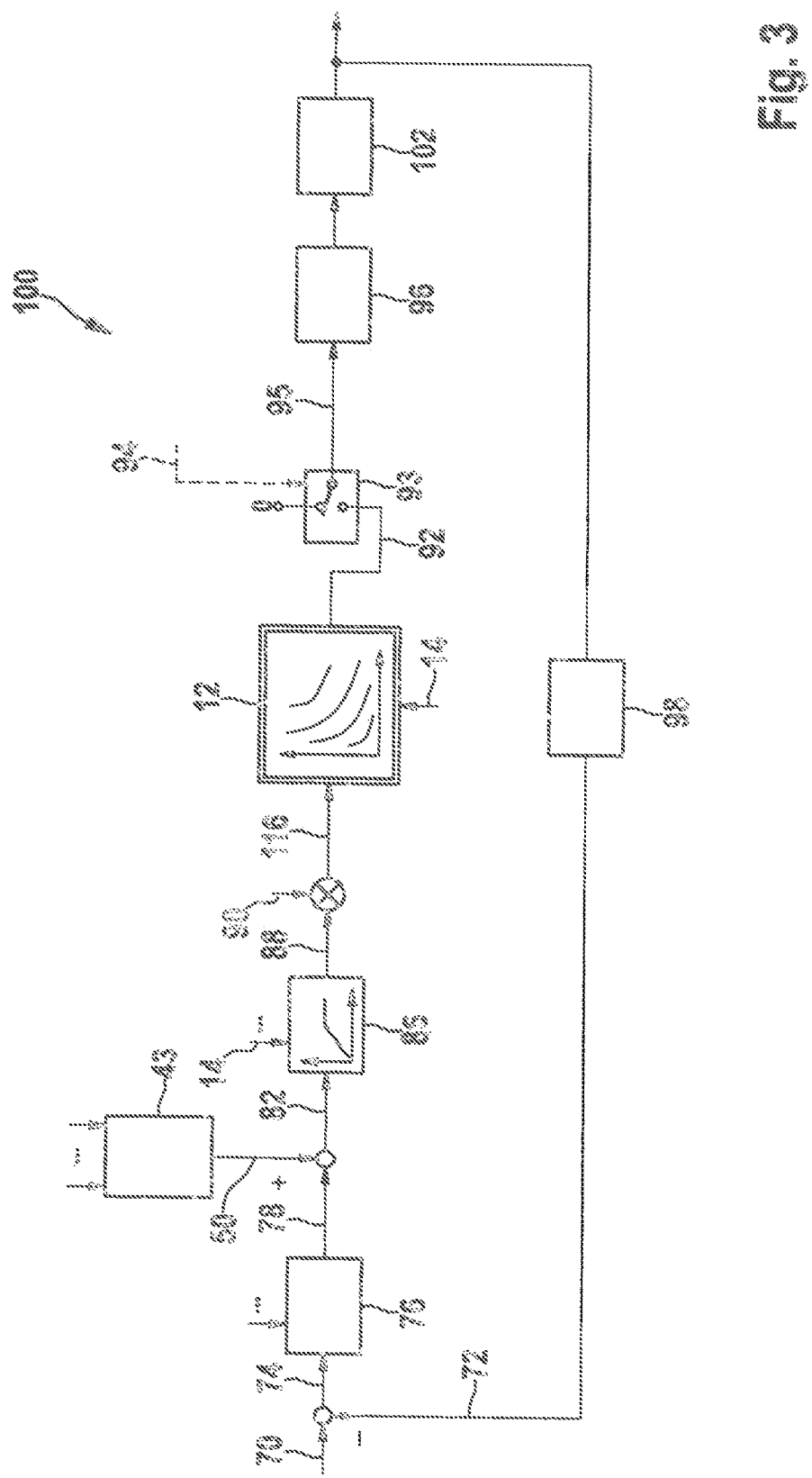
FIG. 3 shows a closed gasoline high-pressure control circuit.

FIG. 3 shows the closed high-pressure gasoline control circuit, which is designated overall by the reference number 100. The difference between the nominal high pressure 70 and the measured actual high pressure 72 is the control deviation 74. This represents the input variable of a PI(DT$_1$) controller 76. The output variable 78 of the PI(DT$_1$) controller 76 is added to the disturbance variable 50; the result of this addition is the unlimited nominal gasoline volumetric flow 82. This is then limited as a function of the engine speed 14 (block 86).

Because the fuel is conveyed by several feed pumps, the limited nominal volumetric flow 88 is then divided by the number of pumps 90. Thus the resulting nominal volumetric flow 116 pertains to an individual pump. By means of a 3-dimensional characteristic diagram, i.e., the gasoline pump characteristic diagram 12, with the input variables engine speed 14 and nominal volumetric flow 116, the angle 92 is determined at which the delivery of the fuel is to begin.

When the engine is off, no fuel can be conveyed. In this case, the logical signal 94 has the value "true", and the switch 93 assumes the upper position, as a result of which the delivery angle is set to the value of 0°.

Each individual high-pressure gasoline pump 96 is actuated on the basis of the resulting delivery angle 95. This angle represents the control input to the high-pressure gasoline circuit 100, which also comprises a pressure filter 98.

The diagram also shows a rail 102, into which the fuel is conveyed by the high-pressure pumps 96.

Figure 4:
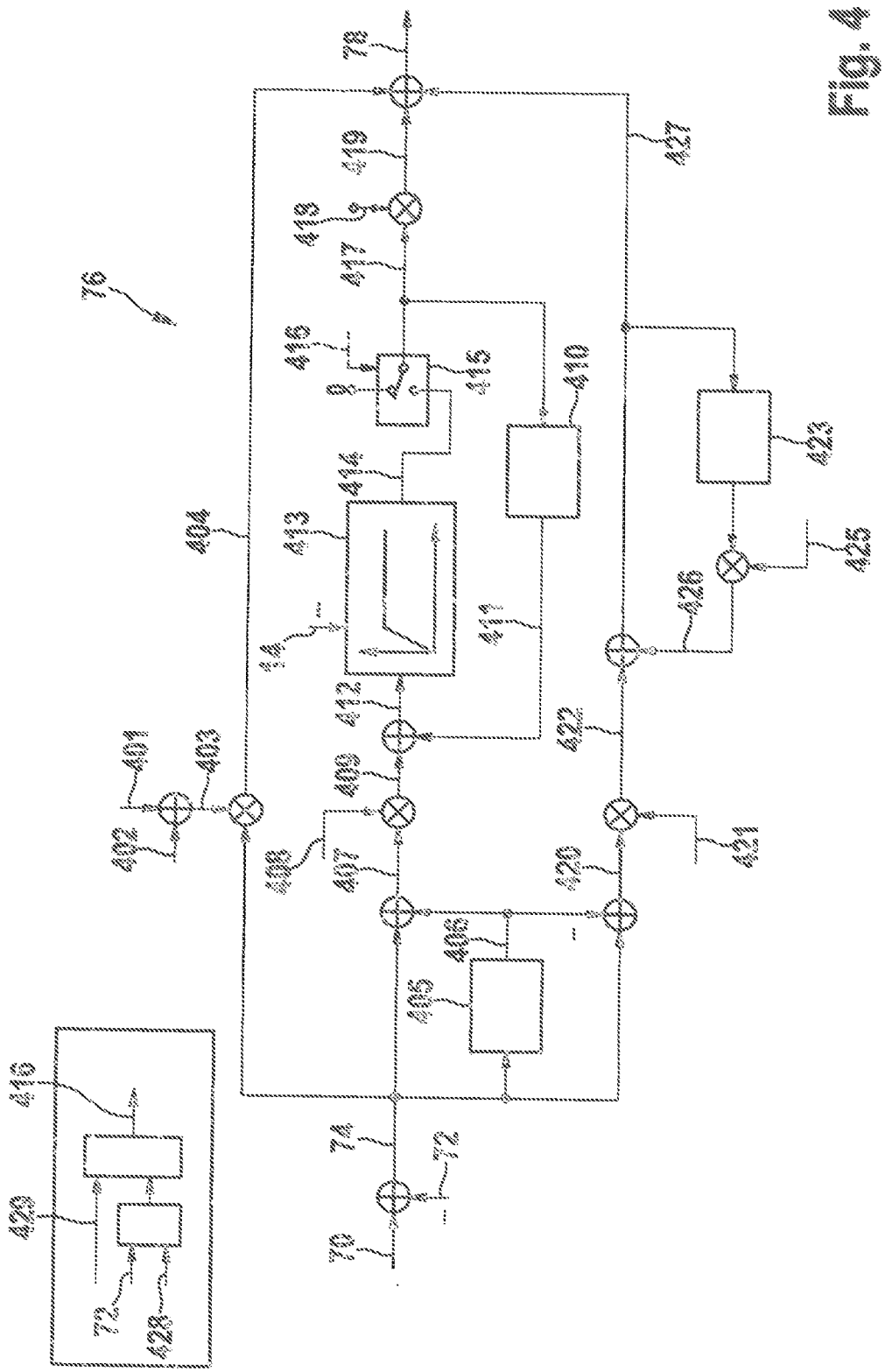
FIG. 4 shows the algorithm of the gasoline high-pressure controller.

FIG. 4 shows the PI(DT$_1$) algorithm of the high-pressure gasoline controller. The reference number 76 is used in FIG. 3 for this algorithm.

The proportional coefficient 403 consists of the sum of a presettable, constant value 402 and a dynamic value 401 dependent on the gasoline high pressure. The proportional coefficient 403 is multiplied by the high-pressure control deviation 74, as a result of which the proportional component 404 of the PI(DT$_1$) algorithm is obtained. The high-pressure control deviation 74 is calculated as the difference between the nominal gasoline high pressure 70 and the actual gasoline high-pressure 72.

To calculate the integrating component (I component) of the PI(DT$_1$) algorithm, the current high-pressure control deviation 74 is first added to the high-pressure control deviation 406, which has been delayed by one sampling step. This sum 407 is multiplied by the factor 408, as a result of which the product 409 is obtained. This product 409 is added to the delayed I component 411, which is delayed by one sampling step. The sum 412 is the input signal to the function block 412. Other input signals to the function block 413 include, for example, the actual engine speed 14. The function block 413 limits the integrating component of the PI(DT$_1$) algorithm in the downward and upward directions when the switch 415 is in the lower position. The lower limit is in this case identical to the negative disturbance variable 50 of the high-pressure gasoline controller (compare FIGS. 2 and 3). The upper limit is identical to the upper limit of the unlimited nominal gasoline volumetric flow 82: The upper limit is constant when the actual engine speed 14 is less than or equal to a presettable limit speed. If the engine speed is greater than this limit speed, the upper limit is proportional to the engine speed (compare FIG. 6).

When the switch 415 is in the upper position, the integrating component is identical to 0. This is the case when the logical signal 416 assumes the value "true". The signal 416 assumes the value "true" when the actual high pressure 72 is less than a presettable limit value 428 and the engine simultaneously is still in the starting phase, that is, the idling speed has not yet been reached after the engine has been started. In this case, the signal 429 assumes the value 1. The I component 417 of the PI(DT$_1$) algorithm is also multiplied by the factor 418. The result 419, finally, is added to the proportional component 404.

For the calculation of the DT$_1$ component, the current high-pressure control deviation 406 delayed by one sampling step is subtracted from the current high-pressure control deviation 74. The difference 420 is then multiplied by the factor 421, as a result of which the product 422 is obtained. To this product is added the DT$_1$ component 426, which has been delayed by one sampling step and multiplied by the factor 425, as a result of which the current DT$_1$ component 427 is obtained. The sum of the proportional component 404, the result 419, and the DT$_1$ component 427, finally, yields the PI(DT$_1$) component 78.

The function blocks 405, 410, and 423 are time-delay elements, which delay the input signal in question by one sampling step.

Figure 5:
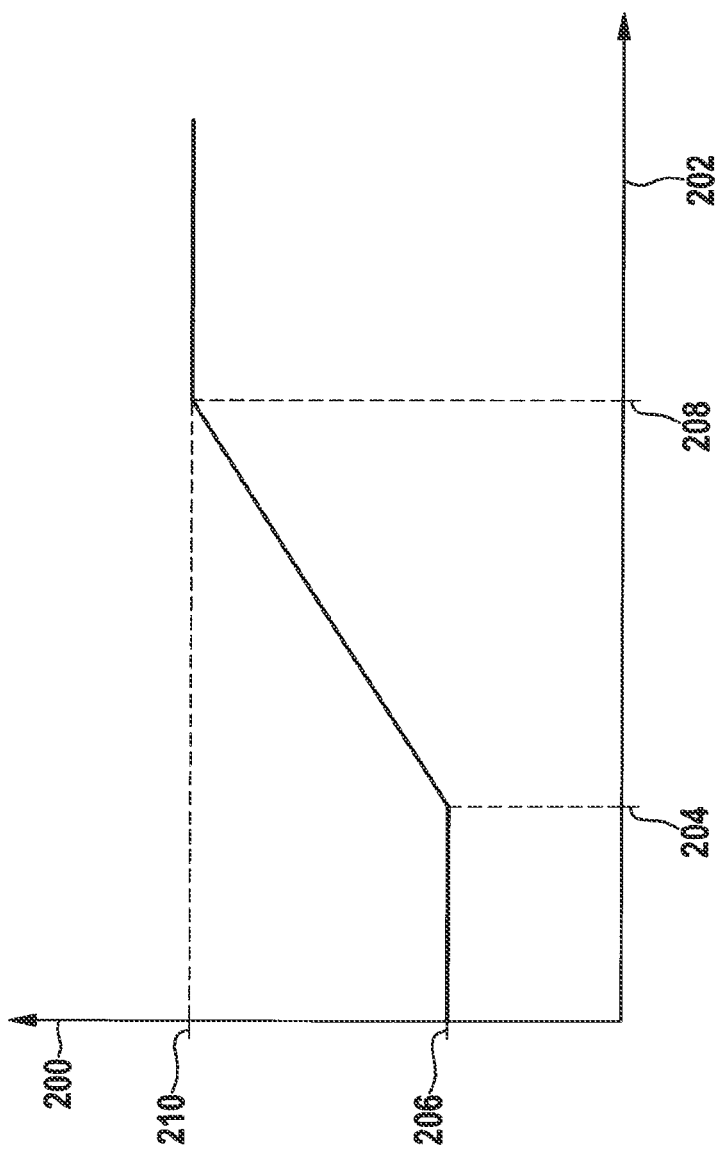
FIG. 5 shows how the dynamic proportional coefficient is calculated.

FIG. 5 shows how the dynamic proportional coefficient 401 is calculated. This value is plotted on the ordinate 200 versus the gasoline high pressure on the abscissa 202.

If the gasoline high pressure is lower than the limit value 204, the dynamic proportional coefficient is identical to the constant, presettable value 206.

If the gasoline high pressure is above the limit value 208, the dynamic proportional coefficient is identical to the constant, also presettable value 210.

If the gasoline high pressure is less than or equal to the upper limit value 208 and greater than or equal to the lower limit value 204, the dynamic proportional coefficient depends in linear fashion on the gasoline high pressure.

Figure 6:
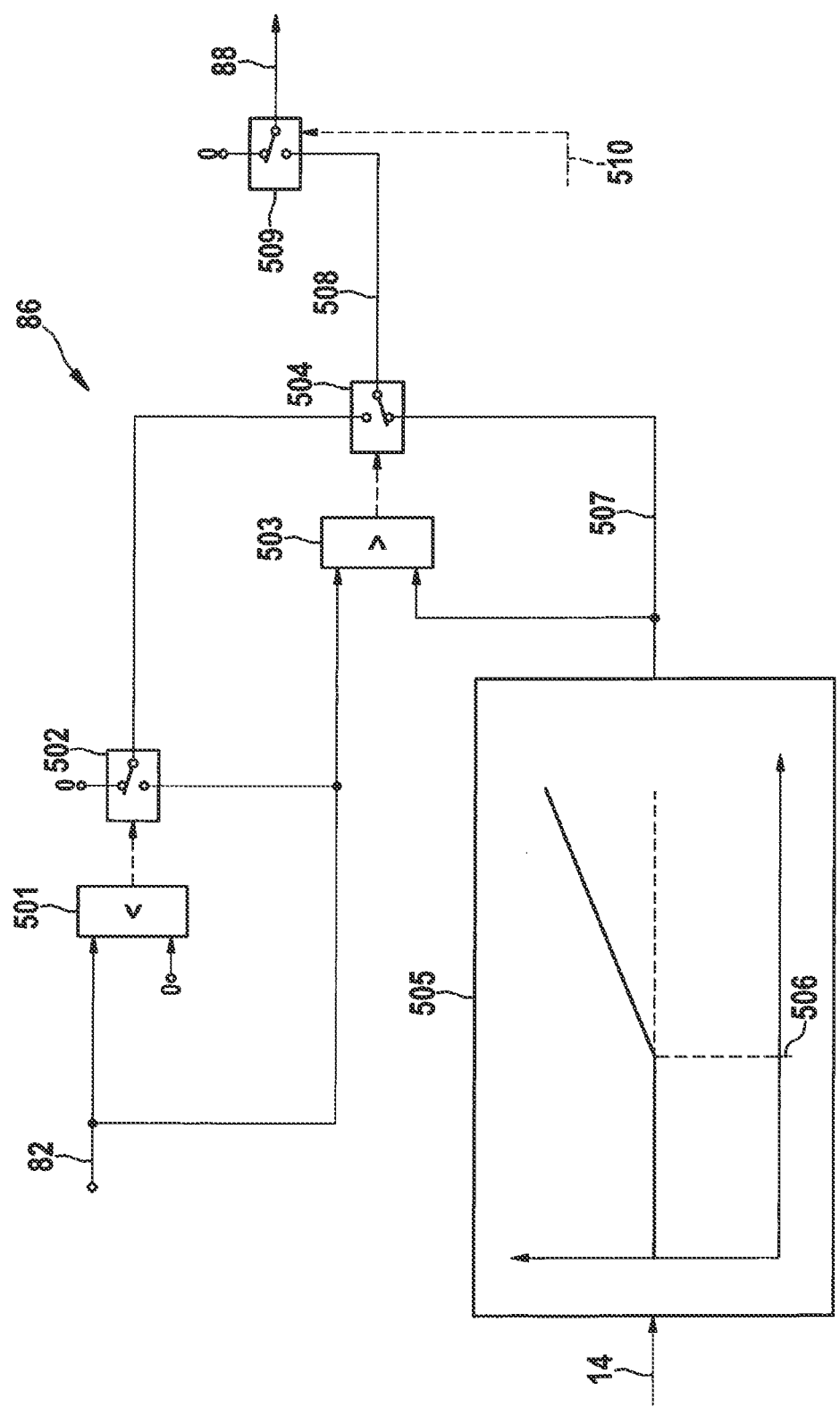
FIG. 6 shows how the nominal volumetric flow of gasoline is limited.

FIG. 6 shows how the unlimited nominal gasoline volumetric flow 82 is limited. The reference number 86 is used for this in FIG. 3.

If the engine is off, the signal 510 is identical to the value "true", and the switch 509 assumes the upper position. Thus the limited nominal gasoline volumetric flow 88 is identical to 0.

If, however, the engine is not off, the limited nominal gasoline volumetric flow 88 is identical to the output of the switch 504, i.e., the signal 508.

The upper limit value of the nominal gasoline volumetric flow is identical to the signal 507, i.e., the output value of the function block 505. If the unlimited nominal gasoline volumetric flow 82 is greater than the upper limit value 507, the switch 504 assumes the lower position; i.e., in this case the signal 508 is identical to the signal 507. Thus the limited nominal gasoline volumetric flow 88 is always identical to the upper limit value 507 of the nominal gasoline volumetric flow when the engine is off and the upper limit value is exceeded. The upper limit value 507 is in this case calculated as the output of the function block 505 as a function of the engine speed 14: If the engine speed is less than or equal to the presettable limit speed 506, the signal 507 assumes a constant value. If the engine speed is greater than the limit speed 506, the upper limit value 507 increases in linear fashion with the engine speed.

If the unlimited nominal gasoline volumetric flow 82 is less than or equal to the upper limit value 507, the switch 504 assumes the upper position. In this case, the signal 508 is identical to the output of the switch 502. If the unlimited nominal gasoline volumetric flow 82 assumes a negative value, the upper position of the switch 502 becomes active; i.e., in this case the output of the switch 502 is identical to the value 0. If, however, the unlimited nominal gasoline volumetric flow 82 is greater than or equal to 0, the switch 502 assumes the lower position, as a result of which its output is identical to the unlimited nominal gasoline volumetric flow 82.

Figure 7:
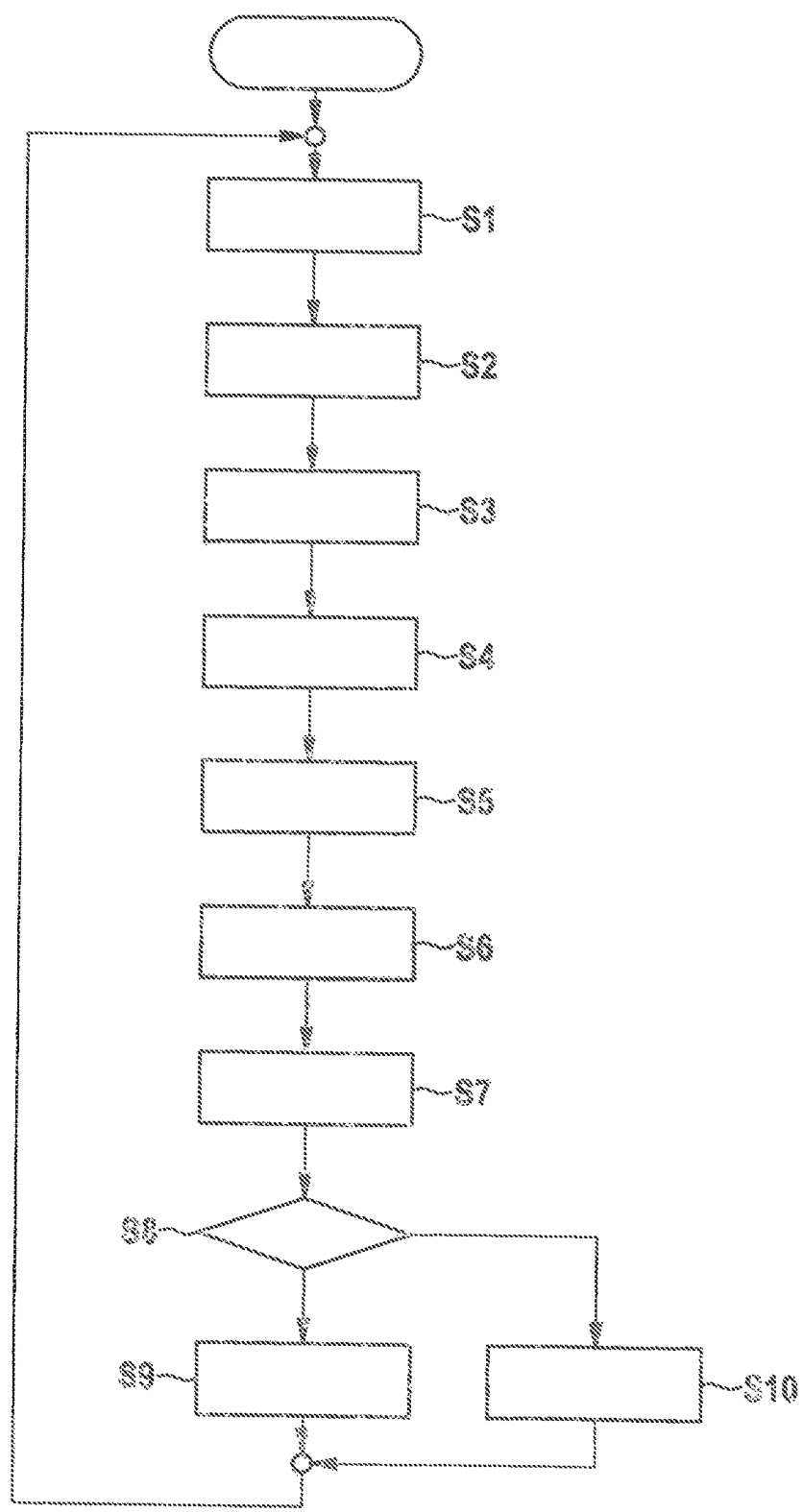
FIG. 7 shows a flow chart of the gasoline high-pressure control.

FIG. 7 shows a flow chart of the operation of the high-pressure gasoline control system. In step S1, the gasoline high pressure 72 is entered. In step S2, the gasoline high-pressure control deviation 74 is calculated as the difference between the nominal gasoline high pressure 70 and the actual gasoline high pressure 72.

In step S3, the output variable of the PI(DT$_1$) high-pressure controller is calculated. In step S4, the unlimited nominal volumetric flow is calculated as the sum of the PI(DT$_1$) high-pressure controller output and the nominal gasoline consumption (addition of the disturbance variable). In step S5, the nominal gasoline volumetric flow is limited.

In step S6, the limited nominal volumetric flow is divided by the number of gasoline high-pressure pumps. In step S7, the delivery angle 95 is calculated as the output variable of the gasoline pump characteristic diagram. In step S8, it is determined whether the engine is off or not. If the engine is not off, the delivery angle is identical to the output variable of the gasoline pump characteristic diagram (step S9). Then the program goes back and begins again with step S1.

The invention claimed is:

1. A method for controlling gasoline pressure in a high-pressure region of an injection system in a dual fuel internal combustion engine comprising at least one high-pressure gasoline pump for conveying gasoline and at least one additional high-pressure pump for conveying a different fuel, the method comprising the steps of:

comparing a target gasoline high pressure with an actual gasoline high pressure to determine a control deviation, wherein the control deviation represents an input variable to a PI(DT$_1$) high-pressure controller; controlling the at least one high-pressure gasoline pump by a solenoid valve; and using a camshaft angle at which delivery of gasoline by the at least one high-pressure gasoline pump begins as a control input to a gasoline high-pressure control circuit, wherein an integrating component is limited in a downward direction to a negative target fuel consumption.

2. The method according to claim 1, wherein the angle is determined based on a target volumetric flow.

3. The method according to claim 2, wherein the angle is determined from a characteristic diagram having input variables that are engine speed and the target volumetric flow.

4. The method according to claim 1, wherein a proportional coefficient is calculated as a function of the actual high pressure.

5. The method according to claim 1, wherein an integrating component is initialized with a value 0 as long as the engine is still in a starting phase and the actual high pressure is less than a presettable limit value.

6. The method according to claim 1, wherein an integrating component is limited in an upward direction as a function of engine speed when a presettable limit speed is exceeded.

7. The method according to claim 2, wherein a number of high-pressure pumps are provided, wherein the number is taken into account in calculating the target volumetric flow.

8. The method according to claim 1, including implementing the method in a high-pressure region of an injection system in which several different fuels are burned.

9. An arrangement for controlling the gasoline pressure in a high-pressure region of an injection system in a dual fuel internal combustion engine according to claim 1, the arrangement comprising: at least one high-pressure gasoline pump for conveying gasoline; at least one additional high-pressure pump for conveying a different fuel; a PI(DT$_1$) high-pressure controller, the controller and the at least one high-pressure gasoline pump being arranged in a gasoline high-pressure control circuit, wherein a target gasoline high pressure is compared with an actual gasoline high pressure to determine a control deviation, wherein the control deviation represents an input variable to the controller; and a solenoid valve that controls the at least one high-pressure gasoline pump, wherein a camshaft angle at which delivery of gasoline by the at least one high-pressure gasoline pump should begin is a control input to the gasoline high-pressure control circuit, wherein an integrating component is limited in a downward direction to a negative target fuel consumption.

10. The arrangement according to claim 9, wherein the arrangement is configured for an injection system in which several types of fuel are burned.

* * * * *